United States Patent
Sandblom et al.

(10) Patent No.: US 12,528,503 B2
(45) Date of Patent: Jan. 20, 2026

(54) PATH SELECTION FOR A VEHICLE BASED ON HEAT DISTRIBUTED ON A ROAD SURFACE

(71) Applicant: Volvo Autonomous Solutions AB, Gothenburg (SE)

(72) Inventors: Fredrik Sandblom, Mölndal (SE); Linus Hagvall, Gothenburg (SE); Stefan Bergquist, Gothenburg (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 147 days.

(21) Appl. No.: 18/509,600

(22) Filed: Nov. 15, 2023

(65) Prior Publication Data

US 2024/0166235 A1    May 23, 2024

(30) Foreign Application Priority Data

Nov. 21, 2022   (EP) ..................... 22208510

(51) Int. Cl.
*B60W 60/00* (2020.01)
*B60W 30/095* (2012.01)

(52) U.S. Cl.
CPC ...... *B60W 60/001* (2020.02); *B60W 30/0956* (2013.01); *B60W 2530/201* (2020.02); *B60W 2554/4044* (2020.02); *B60W 2556/40* (2020.02)

(58) Field of Classification Search
CPC ........... B60W 60/001; B60W 30/0956; B60W 2530/201; B60W 2556/40
See application file for complete search history.

(56) References Cited

U.S. PATENT DOCUMENTS

| | | | |
|---|---|---|---|
| 2019/0346857 A1* | 11/2019 | Chase | G06V 40/23 |
| 2020/0172110 A1* | 6/2020 | Uemori | G05D 1/0212 |
| 2020/0240795 A1* | 7/2020 | Nomura | G06T 1/00 |
| 2022/0178700 A1 | 6/2022 | Wang et al. | |
| 2023/0236313 A1* | 7/2023 | Cserna | G01S 7/4802 |
| | | | 342/53 |
| 2024/0025400 A1* | 1/2024 | Hiskens | B60W 50/14 |

FOREIGN PATENT DOCUMENTS

DE   102020003825 A1 *  2/2021  .......... B60W 30/165

OTHER PUBLICATIONS

Iwasaki, "Robust Vehicle Detection under Various Environmental Conditions Using an Infrared Thermal Camera and Its Application to Road Traffic Flow Monitoring", 2013, MDPI (Year: 2013).*

(Continued)

*Primary Examiner* — Kenneth M Dunne
(74) *Attorney, Agent, or Firm* — Jeffri A. Kaminski; Venable LLP (57) ABSTRACT

A computer system comprising a processor device configured to select a candidate path for a first vehicle to travel is provided. The processor device is further configured to obtain, from at least one temperature sensor, heat sensor data indicative of heat distributed on a road surface of a road located ahead of the first vehicle in a driving direction of the first vehicle. The processor device is further configured to, based on the heat distributed on the road surface, identify at least one first path travelled by at least one second vehicle. The processor device is further configured to select a candidate path for the first vehicle to travel. The candidate path is selected out of the at least one first path.

12 Claims, 8 Drawing Sheets

(56) References Cited

OTHER PUBLICATIONS

Extended European Search Report in corresponding European Application No. 22208510.2 dated May 9, 2023 (9 pages).
Abhay Singh Bhadoriya et al: "Vehicle Detection and Tracking Using Thermal Cameras in Adverse Visibility Conditions", Sensors, vol. 22, No. 12, Published: Jun. 17, 2022, p. 4567, XP093042766, DOI: https://doi.org/10.3390/s22124567; 15 pages.

\* cited by examiner

PATH SELECTION FOR A VEHICLE BASED ON HEAT DISTRIBUTED ON A ROAD SURFACE

TECHNICAL FIELD

The disclosure relates generally to path selection for a vehicle. In particular aspects, the disclosure relates to path selection for a vehicle based on heat distributed on a road surface. The disclosure can be applied in heavy-duty vehicles, such as trucks, buses, and construction equipment. Although the disclosure may be described with respect to a particular vehicle, the disclosure is not restricted to any particular vehicle.

BACKGROUND

Path selection for vehicles such as for automated driving systems commonly uses one or more sensors to figure out where a vehicle is driving and what paths are available for the vehicle. Typically, the vehicle will understand which paths are available based on general assumptions about how a road looks like, e.g., painted lines and markers on the road, traffic signs, and/or by the use of dynamic and/or static maps for the road. In some scenarios however, maps may be poorly updated, may not match the acquired sensor data, and/or roads may be temporarily changed e.g., due to construction, road accidents, etc. In these situations, there may be conflicting information about the road, and selection of a path may be difficult or not possible. Hence, there is a strive to improve path selection for vehicles.

SUMMARY

According to a first aspect of the disclosure, a computer system comprising a processor device configured to select a candidate path for a first vehicle to travel is provided.

The processor device is further configured to obtain, from at least one temperature sensor, heat sensor data indicative of heat distributed on a road surface of a road located ahead of the first vehicle in a driving direction of the first vehicle. The processor device is further configured to, based on the heat distributed on the road surface, identify at least one first path travelled by at least one second vehicle. The processor device is further configured to select a candidate path for the first vehicle to travel. The candidate path is selected out of the at least one first path.

The first aspect of the disclosure may seek to improve path selection for the vehicle.

A technical benefit may include improving path selection and/or enabling to select a path where otherwise not possible, suitable, or accurate to select a path based on other information. For example, when there is a temporary change in the road located ahead of the first vehicle and/or due to conflicting sensor data and map information of the road, path selection is still possible to perform due to identifying the at least one first path travelled by at least one second vehicle based on the obtained heat sensor data indicative of the heat distributed on the road surface. When the road is travelled by the at least one second vehicle, the at least one first path is heated by the at least one second vehicle. In this way, the heat sensor data will indicate where the at least one second vehicle has travelled, and the at least one first path is thereby identified. Furthermore, the candidate path is then selected by any of the paths out of the at least one first path.

As a further advantage, due to identifying the at least one first path from the heat of the at least one second vehicle traveling the at least one first path, the candidate path will always be a path which is part of a popular path travelled by the at least one second vehicle. This is since if the candidate path is selected, the at least one second vehicle has recently travelled on the candidate path. This means that for scenarios when it is difficult to select a path, e.g., due to lack of enough information of the road, selecting the candidate path at least allows the first vehicle to travel a path that is known to be travelable by the at least one second vehicle and therefore ensures a valid path for the first vehicle to travel.

According to a second aspect of the disclosure, a computer-implemented method for selecting a candidate path for a first vehicle to travel is provided. The computer-implemented method comprising:

by a processor device of a computer system, obtaining from at least one temperature sensor, heat sensor data indicative of heat distributed on a road surface of a road located ahead of the first vehicle in a driving direction of the first vehicle, by the processor device, based on the heat distributed on the road surface, identifying at least one first path travelled by at least one second vehicle, and by the processor device, selecting a candidate path for the first vehicle to travel, wherein the candidate path is selected out of the at least one first path.

The second aspect of the disclosure may seek to improve path selection for the vehicle.

A technical benefit may include improving path selection and/or enabling to select a path where otherwise not possible, e.g., due to a temporary change in the road and/or due to conflicting sensor data and map information of the road. The first and second aspects may further have the same corresponding technical benefits.

In some examples, the method further comprises: by the processor device, from one or more second sensors of the first vehicle and/or using static road map data of the road, identifying at least one second path. In some of these examples, selecting the candidate path out of the at least one first path for the first vehicle to travel is performed in response to detecting a difference between the at least one first path and the at least one second path.

A technical benefit may include improved path selection. This is since when the at least one first path and the at least one second path is detected to have a difference, it may be implied that the at least one second path cannot be trusted, at least not completely, otherwise the at least one second vehicle should have travelled on the at least one second path. In this way, higher accuracy of path selection is achieved.

In some examples, the method further comprises: by the processor device, upon detecting the difference between the at least one first path and the at least one second path, triggering the first vehicle to stop and/or to operate in a different mode.

A technical benefit may include improved control of the first vehicle when the at least one first path and the at least one second path is differing. As an example, when detecting the difference between the at least one first path and the at least one second path, it may be determined that the heat sensor data is in conflict with the static road map data and/or sensor data from the set of second sensors. This may mean that the road may be under a temporary change, e.g., re-directed due to accidents or construction etc. In these scenarios, the vehicle may advantageously be configured to be operated in a certain configuration, e.g. with slower maximum allowed speed, and/or to stop and await further instruction of whether or not to proceed on the selected candidate path.

In some examples, obtaining the heat sensor data comprises obtaining a segmented representation of the heat distributed on the road surface. In some of these examples, each segment of the segmented representation is associated with a respective heat value. In some of these examples, identifying the at least one first path travelled by the at least one second vehicle comprises identifying at least one set of segments. In some of these examples, a respective heat value of each segment in the at least one set of segments is above a predefined heat threshold.

A technical benefit may include improved path selection. This is since each segment, e.g., a pixel, may indicate whether or not the road surface is heated, i.e. is above the predefined heat threshold. The combined at least one set of segments then may represent where the at least one second vehicle has travelled and the at least one first path may thereby be identified.

In some examples, the at least one set of segments is arranged in a respective shape indicative of a respective path which can be travelled by the first vehicle.

A technical benefit may include improved path selection. This is since when the respective path is indicated by a respective shape of the at least one set of segments, it can be assured that the first vehicle can travel the respective path. This is since the respective shape may be arranged to be of a certain size, e.g., such that the respective path fulfils size constraints of the first vehicle.

In some examples, a width of the respective shape is within a range of a predefined vehicle width and/or a predefined vehicle track width.

A technical benefit may include improved path selection. This is since the width of the shape can be determined to fulfil the size constraints of the first vehicle. Thereby the first vehicle may be determined to be able to travel the respective path of the respective shape.

In some examples, identifying the at least one set of segments comprises identifying a first set of segments and a second set of segments. In some of these examples, the first set of segments and the second set of segments are separated by one or more segments associated with a respective heat value below the predefined heat threshold.

A technical benefit may include improved path selection. This is since paths which are separated by cool areas, e.g., represented by the one or more segments associated with a respective heat value below the predefined heat threshold, may be determined as different paths, thus allowing the first vehicle more options for path selection and allows the vehicle to more properly drive in a defined path of the road.

In some examples, the at least one first path comprises at least two paths. In some of these examples, selecting the path for the first vehicle out of the at least one first path comprises determining a heat metric of the respective paths of the at least one first path. Determining the heat metric may be based on the heat distributed on the road surface. Determining the heat metric may further be performed using a predefined evaluation function. Selecting the path for the first vehicle out of the at least one first path may in these examples comprise selecting the path with the evaluated heat metric indicative of a highest heat.

In these examples, the predefined evaluation function may be indicative of how to compare the heat metrics for different paths and how to evaluate which path is indicative of the highest heat. For example, each heat metric may be a temperature, and the predefined evaluation function may evaluate an average temperature for each path out of the at least one path, such that selecting the path with the evaluated heat metric indicative of a highest heat comprises selecting the path with the highest evaluated average temperature.

A technical benefit may include improved path selection. This is since the path with the evaluated heat metric indicative of a highest heat is the path most recently chosen and/or most popular to travel by the at least one second vehicle, and thereby is likely to be good choice of a path e.g., leading the vehicle to a road segment which can be recognized by the second set of sensors and static road map data. This further improves accuracy of path selection, e.g., with respect to selecting a path which takes the vehicle to a target destination without leading to a need to stop the vehicle.

In some examples, identifying the at least one first path travelled by the at least one second vehicle is further based on additional sensor data and/or static road map data of the road.

A technical benefit may include improved path selection. This is since when combining information of how to select paths, a more accurate path selection can be made, e.g., with respect to selecting a path which takes the vehicle to a target destination without leading to a need to stop the vehicle.

According to a third aspect of the disclosure, a vehicle comprising a computer system is provided. The computer system may be the computer system of the first aspect. The computer system may be configured to perform the method of the first aspect. The vehicle is at least partly autonomous.

The vehicle may comprise at least one temperature sensor configured to obtain heat sensor data indicative of heat distributed on a road surface of a road located ahead of the vehicle in the driving direction of the vehicle.

According to a fourth aspect of the disclosure, a computer program product is provided. The computer program product comprises program code for performing, when executed by a processor device, the method of the first aspect.

According to a fifth aspect of the disclosure, a control system is provided. The control system comprises one or more control units configured to perform the method of the first aspect.

According to a sixth aspect of the disclosure, a non-transitory computer-readable storage medium is provided. The non-transitory computer-readable storage medium comprises instructions, which when executed by the processor device, cause the processor device to perform the method of the first aspect.

Technical benefits of the third to sixth aspects may correspond to the technical benefits of the first and second aspects.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
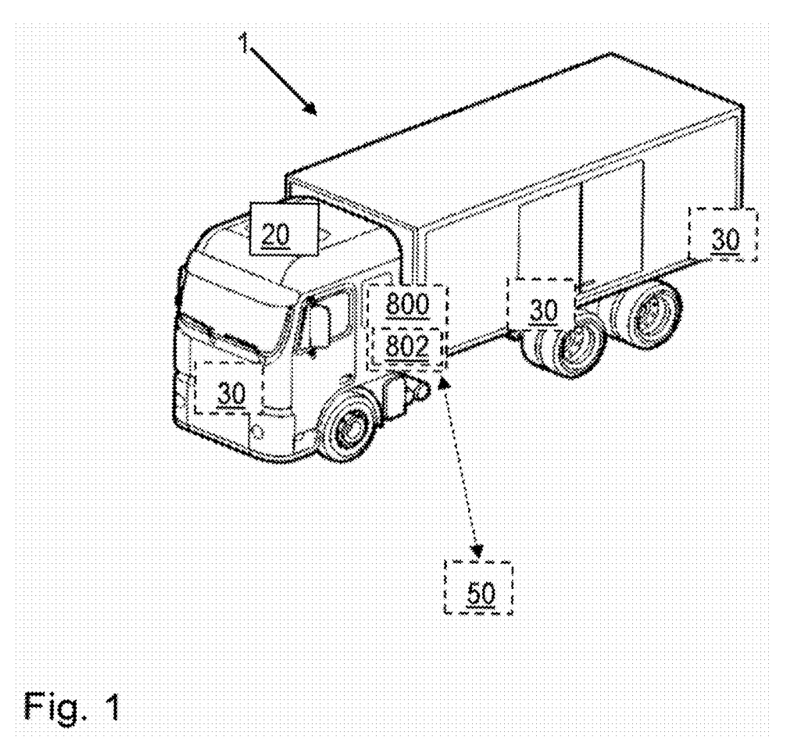
FIG. 1 is an exemplary vehicle according to one example.

FIG. 1 is an exemplary vehicle according to one example. Embodiments herein relates to a first vehicle 1. In FIG. 1, the first vehicle 1 is illustrated to be a truck, however, embodiments herein apply to any suitable vehicle. The first vehicle 1 may therefore also be a car, bus, or any suitable heavy-duty vehicle. The first vehicle 1 may be at least partly autonomous, e.g., the first vehicle 1 may be able to control drive operations for a selected path of a road, also referred to as a candidate path.

The first vehicle 1 comprises at least one temperature sensor 20. The at least one temperature sensor 20 may comprise at least one sensor capable of measuring a temperature on a road surface of a road travelled by the first vehicle 1. For example, the at least one temperature sensor 20 may comprise a heat camera. For example, the at least one temperature sensor 20 may comprise an Infrared (IR) heat sensor, such as an IR heat camera. The at least one temperature sensor 20 may be attached to the first vehicle 1, e.g., and directed towards a road surface in a driving direction of the first vehicle 1.

In some embodiments, the at least one temperature sensor is external to the first vehicle 1, e.g., attached to infrastructure.

The first vehicle 1 may further comprise one or more second sensors 30. The one or more second sensors 30 may for example comprise Light Detection and Ranging (Lidar), sensors and/or cameras. Additionally or alternatively, the one or more second sensors 30 may comprise any suitable sensor for determining a path on a road travelled by the first vehicle 1. Additionally or alternatively, the one or more second sensors 30 may comprise a positioning sensor for positioning the first vehicle 1 on a road it is travelling on, e.g., a Global Navigation Satellite System (GNSS) sensor e.g., a Global Positioning System (GPS) sensor.

The one or more second sensors 30 may be used to position the first vehicle 1. e.g., to determine which one or more paths are or should be available to the first vehicle 1.

Embodiments herein may be performed at least partly by a computer system 800, and a processor device 802 therein. The computer system 800 may be comprised in the vehicle 1, or may be at a remote location communicatively coupled to the vehicle 1, e.g., in a server or control station which may be arranged to remotely control the vehicle 1. The computer system 800 and/or the processor device 802 therein may be able to obtain heat sensor data from the at least one temperature sensor 20. The computer system 800 and/or the processor device 802 therein may be able to obtain sensor data from the one or more second sensors 30. The computer system 800 and/or the processor device 802 therein may be able to obtain static road map data of roads, e.g., a road travelled by the first vehicle 1. The first vehicle 1 may via the computer system 800 and/or the processor device 802 be in communication with a server 50, e.g., from where the static road map data is obtained. The computer system 800 and/or the processor device 802 therein may further, directly or indirectly, control and/or communicate with any suitable entity comprised in the vehicle 1. The computer system 800 and/or the processor device 802 therein may further be able to select a candidate path for the first vehicle 1 to travel.

Embodiment herein may exploit that a passing vehicle heats up a road such that it may be determined which parts of a road has been driven using heat sensor technology, e.g., IR imager technology using the at least one temperature sensor 20. In this way, the first vehicle 1 is provided a redundant source of information where other vehicles has driven before, directly measured on a road surface which improves path selection. This allows the first vehicle 1 to mimic a behavior of other vehicles, e.g., when path selection is otherwise not possible or deemed to be inaccurate.

Figure 2:
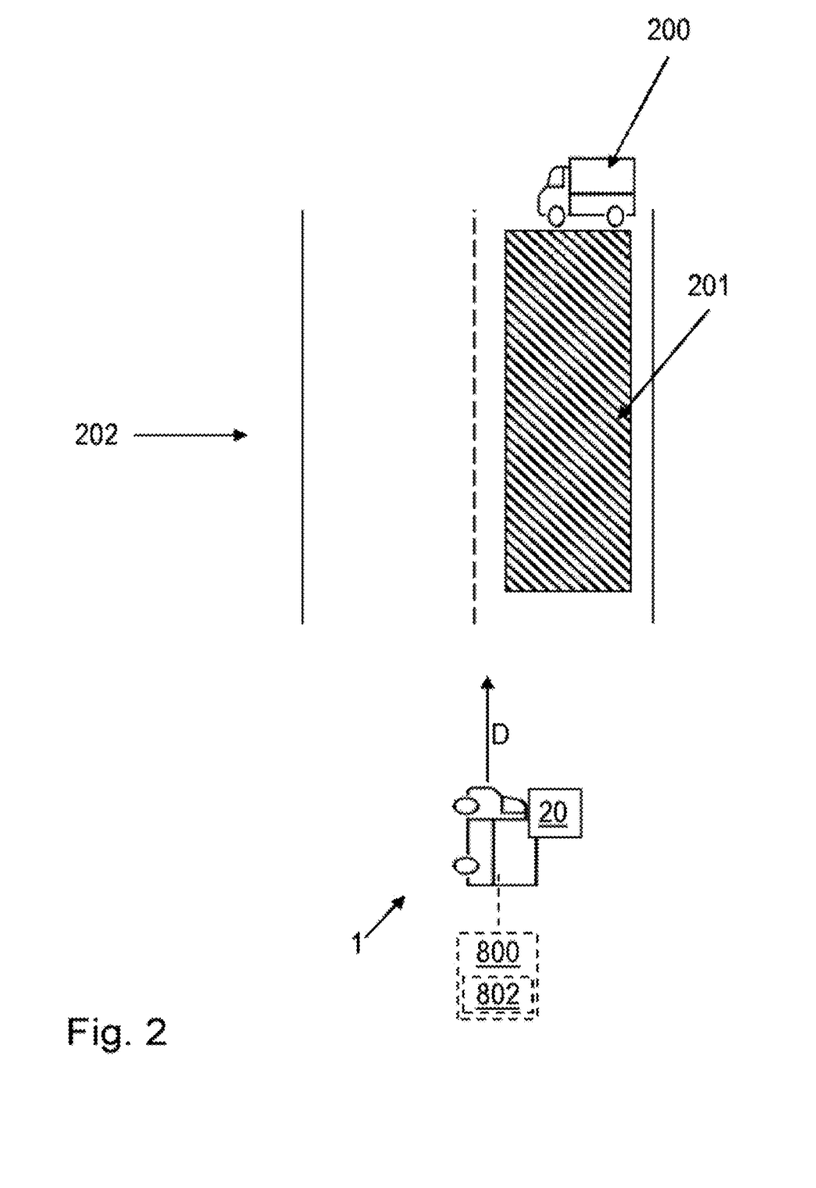
FIG. 2 is another view of FIG. 1, according to another example.

FIG. 2 is another view of FIG. 1, according to another example.

FIG. 2. Illustrates the computer system 800 comprising the processor device 802. The computer system 800 comprising the processor device 802 is configured to select a candidate path for the first vehicle 1 to travel. The processor device 802 is further configured to, obtain, from the at least one temperature sensor 20, heat sensor data indicative of heat distributed on a road surface of a road 202 located ahead of the first vehicle 1 in a driving direction D of the first vehicle 1. The processor device 802 is further configured to, based on the heat distributed on the road surface, identify at least one first path 201 travelled by at least one second vehicle 200. The at least one first path 201 may be any suitable number of paths, each travelled by one or more vehicles of the at least one second vehicle 200. The at least one second vehicle 200 may be any one or more vehicles, each vehicle of the at least one second vehicle 200 may be of any suitable type. The processor device 802 is further configured to, select a candidate path for the first vehicle 1 to travel. The candidate path is selected out of the at least one first path 201.

Figure 3:
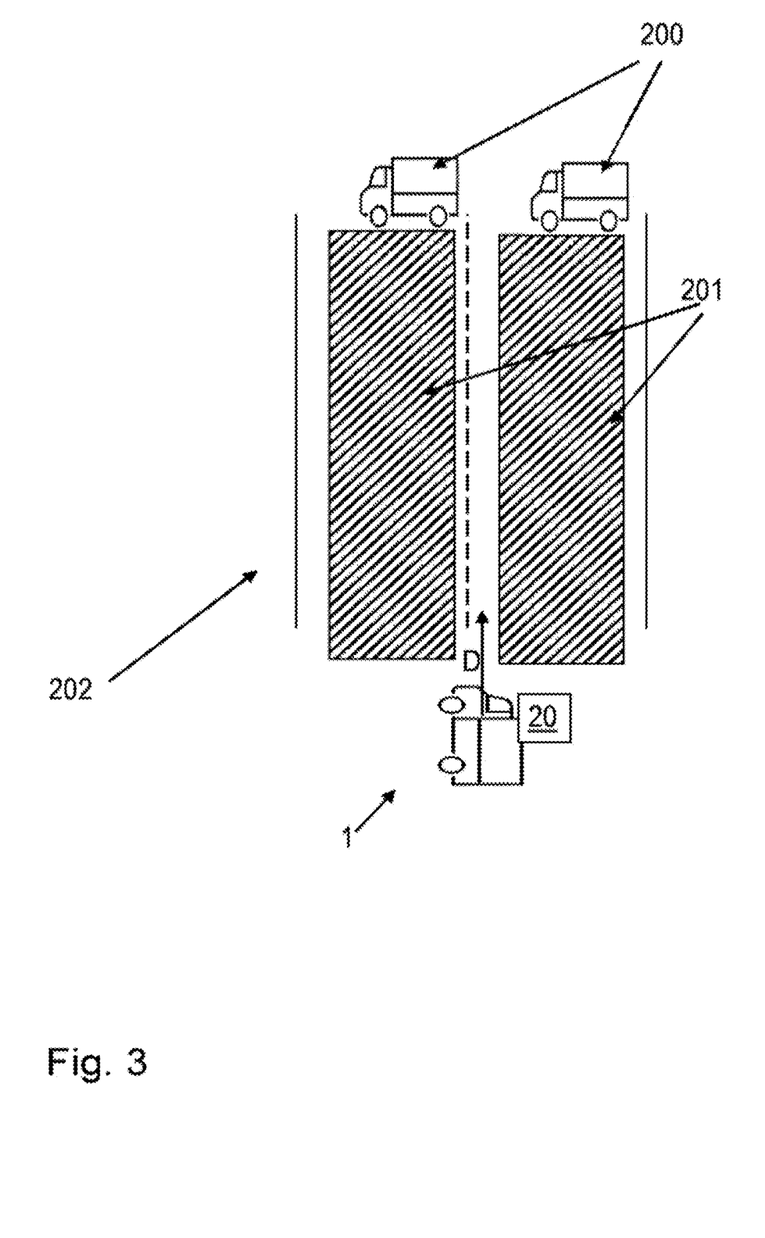
FIG. 3 is an example scenario for when selecting a candidate path.

FIG. 3 is another view of FIG. 2, according to another example wherein the at least one path 201 comprises two paths. The first vehicle 1 drives in the driving direction D on the road 202. The processor device 802 obtains from the at least one temperature sensor 20, heat sensor data indicative of heat distributed on the road surface of a road 202 located ahead of the first vehicle 1 in the driving direction D of the first vehicle 1. In this example scenario, two paths will be identified based on the heat sensor data. This is since two vehicles as part of the at least one second vehicle 200 have travelled two different paths of the road 202 causing the road surface to warm up such that the heat sensor data leaves a trace of where the respective vehicle has travelled. In this way, two different paths are identified based on the heat sensor data. The candidate path may be selected to be any one of the two different paths. For example, when it is unclear exactly which path is leading the first vehicle to a certain destination, the most travelled and/or most recently travelled path may be a suitable option as it ensures that the first vehicle 1 will not travel into a dead end. Thus, to achieve this, the warmest of the two paths may be selected, e.g., by comparing the heat sensor data of each of the paths. This is since the warmest path, e.g., by any suitable evaluation such as average temperature and/or highest peak temperature, is the path which is most recently travelled and/or the path which most vehicles have recently travelled.

Figure 4:
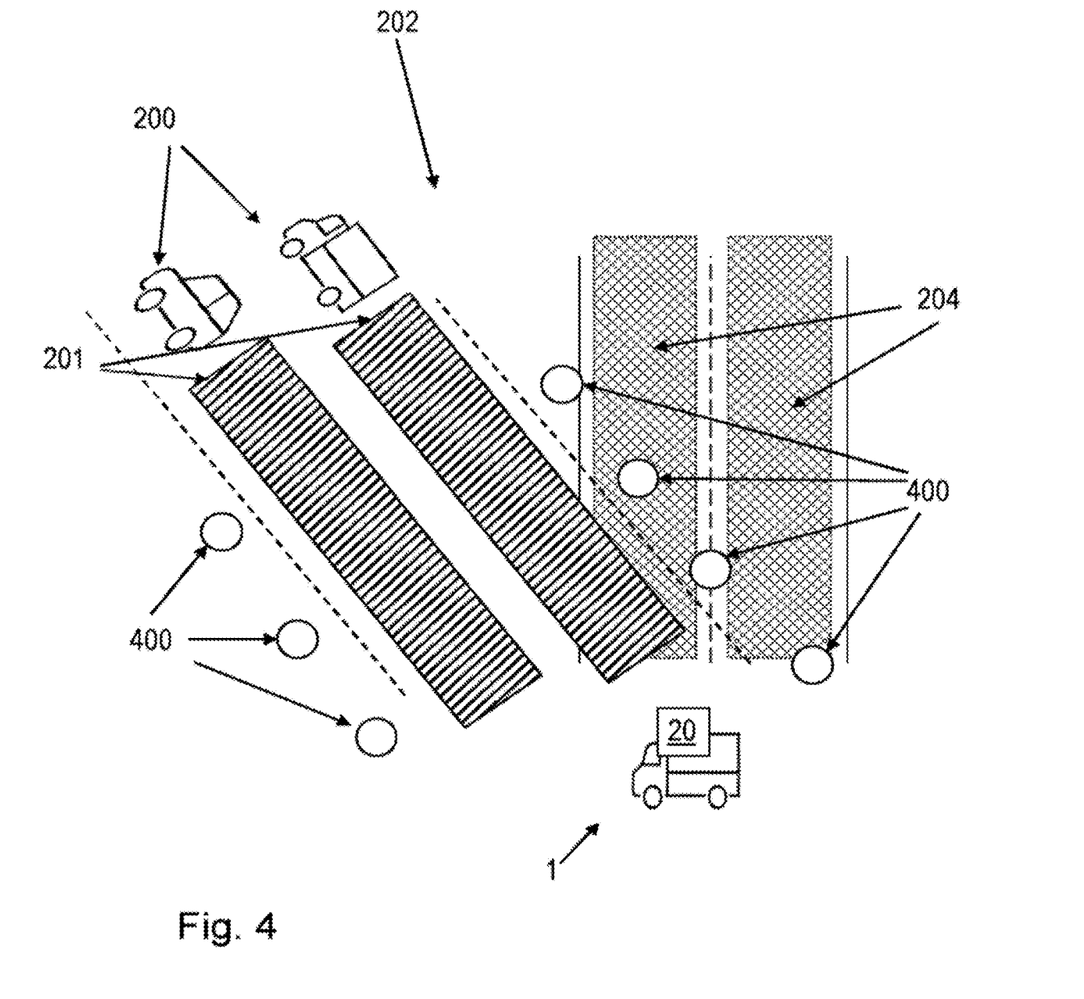
FIG. 4 is an example scenario for when selecting a candidate path during a temporary change of a road.

FIG. 4 is an example scenario for when selecting a candidate path during a temporary change of a road, e.g., as another view of FIGS. 2-3. Embodiments herein may be suitable for situations where traffic is temporarily rerouted due to accidents, road construction, etc. This means that normal sensor data, e.g., as obtained from the one or more second sensors 30 and/or the static road map data cannot be used to fully understand the current available paths for the first vehicle 1. As an example, the sensor data, e.g., as obtained from the one or more second sensors 30 and/or the static road map data may indicate at least one second path 204 which should be travelable for the first vehicle 1. However, in this scenario, the road has been temporarily changed and the vehicles travelling the road 202 is to be rerouted to drive on the at least one first path 201, such as also indicated by road obstacles 400, e.g., traffic cones, barriers, and/or fences. A human driver would instinctively understand such a situation, however, sensor data of the one or more second sensors 30 and/or the static road map data cannot easily understand such situations and would therefore not always be able to identify a path for the first vehicle 1 to travel. This is since the static road map data may, in combination with positioning information, e.g., from a GPS of the one or more second sensors, only know about the at least one second path 204. Additionally or alternatively, road markers on the road may still indicate to a camera of the one or more second sensors 30, that the at least one second path 204 is selectable for the first vehicle to travel 1. If a path from the at least one second path 204 was selected as a candidate path for the first vehicle 1 to travel, the road obstacles 400 would however be detected by the first vehicle 1. This may cause the first vehicle 1 to be stopped and/or switching to manually be handled by a user. Instead, in embodiments herein, the at least one second path 204 is identified from the heat produced when travelled by the at least one second vehicle 200. A candidate path for the first vehicle 1 can then be selected from the at least one second path 201. In some embodiments, the at least one second path 204, and the at least one first path 201 are both always identified, and only when there is a difference, such that a path in the at least one first path 201 is not identified to be part of the at least one second path 204, the candidate path is selected from the at least one first path 201.

Figure 5:
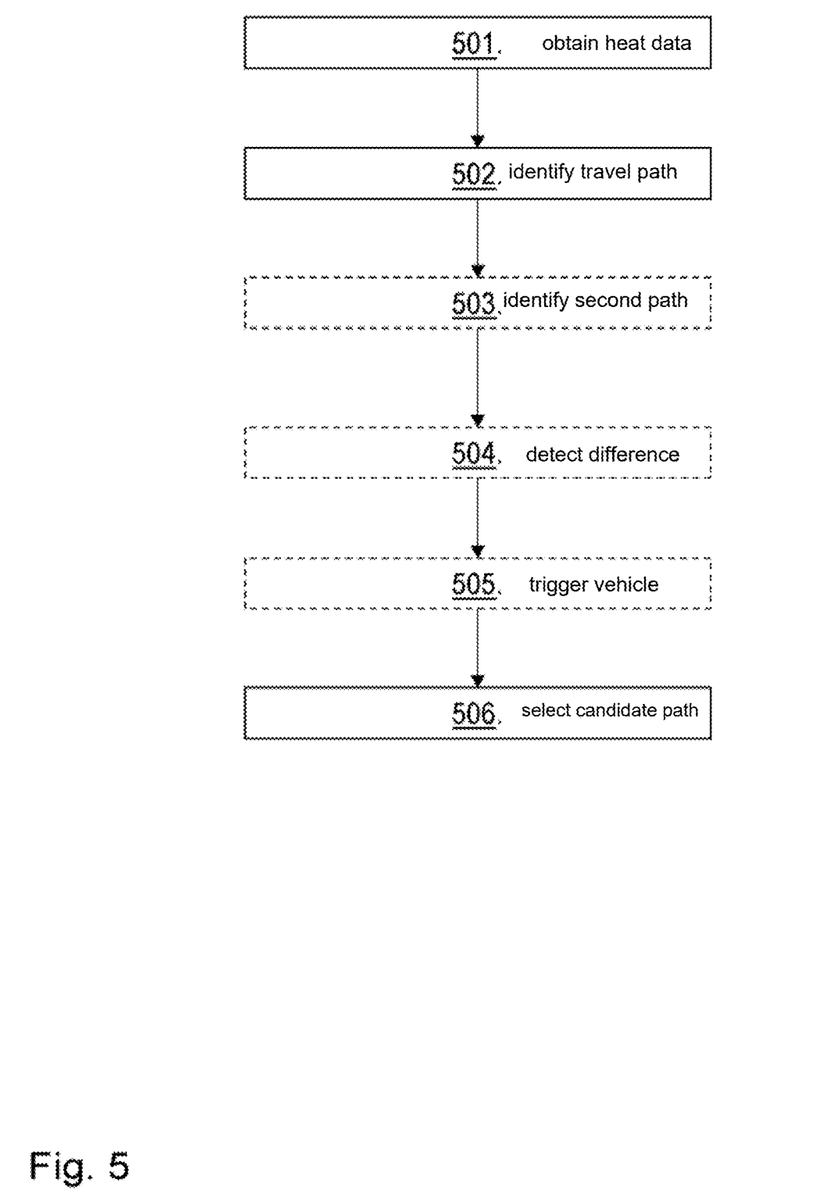
FIG. 5 is a flow chart of an exemplary method to select a candidate path for a vehicle according to one example.

FIG. 5 is a flow chart of an exemplary method to select a candidate path for the first vehicle 1 to travel, according to one example. The method may be a computer-implemented method, performed by the processor device 802 and/or by any other suitable means. The method comprises may comprise the following actions, in any suitable order. Optional actions are illustrated by dashes boxes in FIG. 5.

Action 501

The method comprises, by the processor device 802 of the computer system 800, obtaining from the at least one temperature sensor 20, heat sensor data indicative of heat distributed on a road surface of a road 202 located ahead of the first vehicle 1 in a driving direction D of the first vehicle 1.

The at least one temperature sensor 20 may be configured to generate a temperature image of the road 202, e.g., a heatmap. In other words, the obtained heat sensor data may be the generated temperature image. The temperature image may indicate where on the road 202 the at least one second vehicle 200 has travelled.

In other words, the heat sensor data may be a heatmap e.g., as part of a photo or a video.

The heat sensor data may be segmented into one or more segments, e.g., pixels. For example, each segment may be associated with a corresponding heat value, e.g., indicating the temperature of the road surface represented by the respective segment. As an example, in some embodiments, obtaining the heat sensor data comprises obtaining a segmented representation of the heat distributed on the road surface. Each segment of the segmented representation may be associated with a respective heat value.

Action 502

The method further comprises, by the processor device 802, based on the heat distributed on the road surface, identifying the at least one first path 201 travelled by the at least one second vehicle 200.

Action 503

In some embodiments, the method further comprises, by the processor device 802, from the one or more second sensors 30 of the first vehicle 1 and/or using static road map data of the road 202, identifying at least one second path 204, e.g., as illustrated by FIG. 4. The at least one second path 204 may be at least one standard path for the first vehicle 1 to travel, but is now blocked, e.g., by road obstacles, and the first vehicle 1 may be arranged to be partially rerouted to go around a road construction area, road accident, or similar. The at least one second path may be identified by use of the static road map data, which may indicate selectable paths for the first vehicle 1. Additionally or alternatively, the first vehicle 1 may use sensors of the one or more second sensors 30 to independently and/or combined with the static road map data to identify the at least one second paths, e.g., using GPS with the static road map data and/or a camera for identifying drawn road markers on the road 202, etc.

In some embodiments, identifying the at least one first path 201 travelled by the at least one second vehicle 200 comprises identifying at least one set of segments, e.g., as obtained in action 501. In some of these embodiments, a respective heat value of each segment in the at least one set of segments is above a predefined heat threshold. In other words, the at least one first path 201 may be identified by identifying the at least one set of segments e.g., which are indicated places on the road surface, e.g., as indicated by the heat sensor data, which places each are above a certain temperature, e.g., as indicated by the respective heat values.

The at least one set of segments may be identified to only comprise set of segments which are likely to be travelable by the first vehicle 1 and/or the at least one second vehicle 200. I.e., one or more size constraints may be need to be fulfilled for a set of segments to be identified to be part of the at least one set of segments.

The at least one set of segments may be arranged in a respective shape indicative of a respective path which can be travelled by the first vehicle 1. For example, a set of segments may need to be organized in an elongated manner, e.g., and to fit a vehicle, to be identified to be part of the at least one set of segments.

The shape may be a shape of respective wheels warming up the road surface of the road 202 and/or a shape of a full width of a vehicle, e.g., as the at least one second vehicle 204 may warm up all of the areas of each path of the at least one first path 201.

In some embodiments, a width of the respective shape is within a range of a predefined vehicle width and/or a predefined vehicle track width. In other words, a set of segment may need to be within the range of the predefined vehicle width and/or a predefined vehicle track width to be identified to be part of the at least one set of segments. The range of the predefined vehicle width and/or the predefined vehicle track width may be any suitable width covering a vehicle and/or between wheels of a vehicle with a predefined error margin. When two different set of segments are respectively of a width smaller than a threshold and within the range of the predefined vehicle track width, they may together be identified as one combined set of segments, e.g., as the two different segments pertains to each part of where a wheel has travelled the road surface, but the width in-between may need to be identified to be part of the at least one first path 201.

As an example scenario, identifying the at least one set of segments comprises identifying a first set of segments and a second set of segments. In some of these embodiments, the first set of segments and the second set of segments are separated by one or more segments associated with a respective heat value below the predefined heat threshold, i.e. a cool area between the segments. The first set of segments and a second set of segments may each respectively represent an identified respective path of the at least one path 201.

In some embodiments, identifying the at least one first path 201 travelled by the at least one second vehicle 200 is further based on additional sensor data and/or static road map data of the road 202. In other words, embodiments herein may be used on any normal road, e.g., as a complement for improved accuracy for when selecting a path.

In some embodiments the additional sensor data and/or static road map indicates the same path as the at least one first path 201, the first path 201 may be considered more accurate.

Action 504

In some embodiments, the method further comprises, by the processor device 802, detecting a difference between the at least one first path 201 and the at least one second path 204, e.g., as identified in action 503.

The difference may be detected by detecting that any one or more out of size, direction, shape, and location, is differing between the at least one first path 201 and the at least one second path 204, e.g., by more than a respective threshold. Additionally or alternatively, the difference may be detected by detecting that at least a part of the at least one first path 201 is not part of the at least one second path 204. For example, the difference may be detected by detecting that the at least one first path 201 comprises a path which is not identified to be part of the at least one second path 204, thus indicating a discrepancy between the identified paths.

Action 505

In some embodiments, the method further comprises, by the processor device 802, upon detecting the difference between the at least one first path 201 and the at least one second path 204, e.g., as in action 504, triggering the first vehicle 1 to stop and/or to operate in a different mode. For example, as the paths for the road 202 has changed, driving conditions may have changed which may require more caution and/or other actions of the vehicle 1, and thus triggering the first vehicle 1 to operate in a different mode may comprise configuring the first vehicle 1 to any one or more out of:

lower a maximum allowable speed for the vehicle 1,
to re-configure a motion planning algorithm of the first vehicle 1, e.g., by switching a first motion planning algorithm to a second different motion planning algorithm to be applied by the first vehicle 1,
to re-configure a traffic prediction model, e.g., by switching to a more conservative traffic prediction model wherein more traffic participants are predicted, i.e. the traffic situation is conservatively assumed to be more densely packed with other traffic participants.

Selecting the at least one first path may in some embodiments always be considered a safe option as the first vehicle 1 may always have sensors for detecting any dangers which causes the first vehicle to perform an emergency stop. However, as the first vehicle 1 is deviating from an original path of the road 202, e.g., as indicated by the static road map, a user may need to be notified to confirm that the first vehicle 1 can continue to select a candidate path from the at least one first path 201. Hence, the first vehicle may stop when detecting the difference between the at least one first path 201 and the at least one second path 204, and subsequently prompting a user of the first vehicle 1 of whether or not to select a candidate path from the at least one first path 201.

Action 506

The method further comprises, by the processor device 802, selecting a candidate path for the first vehicle 1 to travel. The candidate path is selected out of the at least one first path 201.

In some of these embodiments, selecting the candidate path out of the at least one first path 201 for the first vehicle 1 to travel is performed in response to detecting a difference between the at least one first path 201 and the at least one second path 204, e.g., as performed in Action 504.

In some embodiments, the at least one first path 201 comprises at least two paths. In some of these embodiments, selecting the path for the first vehicle 1 out of the at least one first path 201 comprises determining a heat metric of the respective paths of the at least one first path 201. Determining the heat metric may be based on the heat distributed on the road surface. Determining the heat metric may be performed using a predefined evaluation function. Selecting the candidate path may further comprise selecting the path with the evaluated heat metric indicative of a highest heat. Selecting the path with the evaluated heat metric indicative of a highest heat may comprise selecting the warmest path. This may allow the first vehicle 1 to travel a path recently travelled by the at least one second vehicle 200 which leads the first vehicle 1 to a path which at least does not immediately result in a dead end or otherwise blocked path.

As an example, determining the heat metric may comprise using any suitable heuristics, such as determining the path with the highest temperature, e.g., which path is indicated by the heat sensor data to have a highest heat value for a single respective segment. Additionally or alternatively, determining the heat metric may comprise determining an average value of the different paths, e.g., by averaging the respective heat values of the set of segments for the respective paths.

Figure 6:
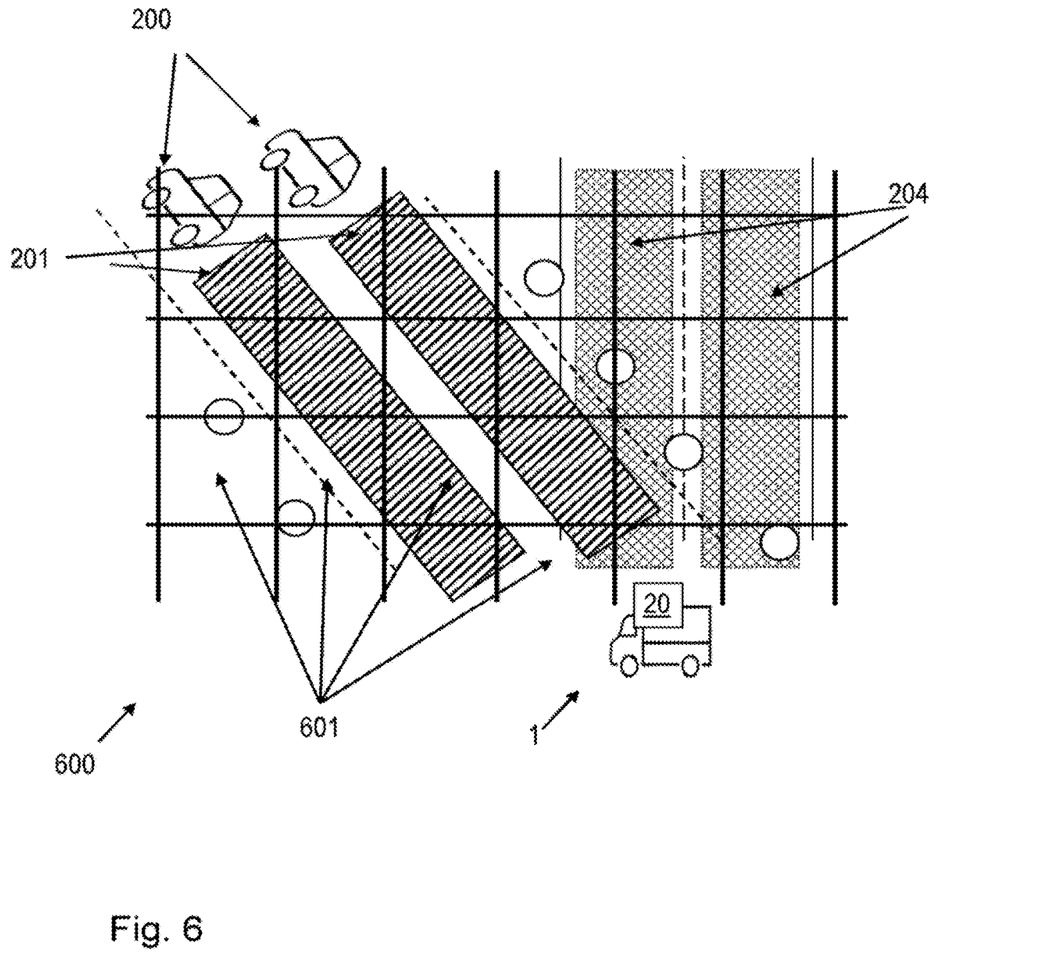
FIG. 6 is an example scenario illustrating segmented representation of heat on a road surface.

FIG. 6 is an example scenario illustrating a segmented representation 600 of heat distributed on the road surface of the road 202. The segmented representation 600 comprises multiple segments 601. The segmented representation 600 may be a photo or a video from an IR camera as part of the at least one temperature sensor 20. Each segment 601 may be a pixel, e.g., from the photo or video from the IR camera. Each segment 601 may be associated with a respective heat value. It shall be noted that the segmented representation 600 illustrated in FIG. 6. is not scaled and typically the segments are fine grained, each representing a small part of a picture or video of a road surface of the road 202, e.g., each segment is a pixel of a photo/video or any other suitable area representation. In the example illustrated in FIG. 6, the at least one second path 204 is not part of the obtained heat sensor data, e.g., as obtained in action 501, instead, there are two sets of segments identified out of the segments 601, both identifying a respective path in the at least one path 201, travelled by the at least one second vehicle 200.

Figure 7:
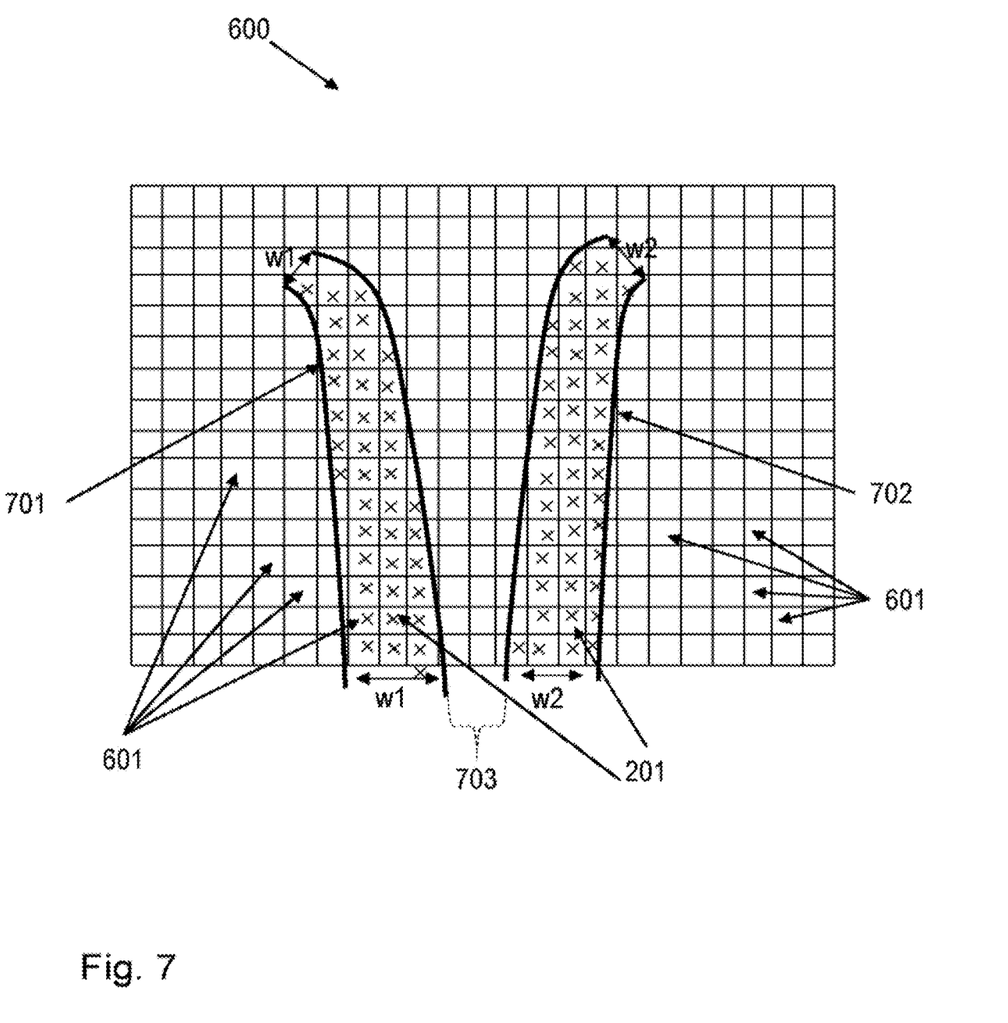
FIG. 7 is an example scenario illustrating a shape defined by a segmented representation of heat on a road surface.

FIG. 7 is an example scenario illustrating a shape defined by the segmented representation 600. When segments 601 in the segmented representation 600 has an associated respective heat value above the predefined heat threshold, they may identify one or more sets of segments which respectively identify a path in the at least one path. In the scenario of FIG. 7, each segment 601 with a respective heat value above the predefined heat threshold is illustrated with an x, an in a corresponding manner, each segment 601 with a respective heat value below the predefined heat threshold is illustrated with an empty cell.

For example, at least one set of segments may be arranged in a shape indicative of a respective path which can be travelled by the first vehicle 1. In the example of FIG. 7, a first shape 701 and a second shape 702 is illustrated. The shapes comprise a set of respective segment each with heat values above the predefined heat threshold. The respective shapes 701, 702 may be arranged in any suitable patterns suitable in size for a road or vehicle tracks, e.g., they may be arranged in any suitable manner as long as a vehicle such as the first vehicle 1 may be able to travel the path. Whether or not each shape represents a path which can be travelled by the at least first vehicle 1 may be determined by any suitable heuristics. For example, that a width of the respective shape is wide enough for a vehicle.

The first and second shapes 701, 702 may for example be detected in a temperature image of the temperature sensor data as a curve, e.g. represented by a polynomial or by a clothoid.

In other words, a width of the respective shape 701, 702 is within a range of a predefined vehicle width and/or a predefined vehicle track width. The first shape 701 may be associated with a first width w1. The second shape 702 may be associated with a second width w2. Since the segmented representation 600 may be a photo or a video, the segmented representation may be a two-dimensional view of the road surface of the road 202. This means that the first and second shapes 701, 702 and their respective widths w1, w2 may appear to be different sizes due to projecting the road surface in a two-dimensional plane. As such, some image processing of the segmented representation may need to be made e.g., when assessing whether or not the shapes are wide enough for a vehicle to drive in.

The first and second shapes 701, 702 may be separated by a cool area 703. The cool area 703 may comprise at least one set of segments comprising segments with respective associated heat values below the predefined heat threshold.

Further Variations

Below follows further variations which may be seen as embodiments in addition to, or as an alternative to the actions presented above. Below variations may be combined with the above actions and/or examples.

In some examples, the at least one temperature sensor 20 may comprise a sensor S1 with a capability to detect temperature with high accuracy, e.g., above a threshold, and with a resolution with respect to the road surface of the road 202 sufficient to distinguish between areas driven recently e.g., by the at least one second vehicle 200, and those areas that correspond to background temperature.

In some examples herein, a component P1 may be part of the first vehicle 1, e.g., part of the computer system 800 and/or controlled by the processor device 802. The component P1 may be a component configured to perform path generation and to generate areas where paths can be planned, e.g., the at least one first path 201.

In some examples herein, a component C1 may be part of the first vehicle 1, e.g., part of the computer system 800 and/or controlled by the processor device 802. The component C1 may be a component configured to select a path, e.g., the candidate path as in action 506, and to control the first vehicle 1 to travel the selected path accordingly.

C1 may further take input from multiple sensors to determine the path and may apply a control strategy developed to regard objects and events such that the first vehicle 1 can travel safely.

Examples herein may first use S1 to obtain image data, e.g., a heatmap, e.g., as in action 501. Subsequently, the image data may be processed by P1, e.g., to identify the at least one path 201, e.g., as in action 502. C1 may then select the path, e.g., the candidate path as in action 506, and control the first vehicle 1 to travel the selected path.

The at least one first path 201 as identified in examples herein may always be included as a source for motion planning for the first vehicle 1, and may be fused with information from other sensors, e.g., the one or more second sensors 30, such as any one or more out of: cameras, lidars, radar, GPS and a map. In this case all combined sensor information may be used to create a trajectory which the first vehicle 1 should follow, e.g., when selecting the candidate path 506.

The at least one first path 201 as identified in examples herein may be used only for scenarios when it is detected that map information, e.g., the static road map data, is not up to date e.g. construction site signs indicating changed lanes are detected, a miss-match between real-time onboard sensors, e.g., of the at least one second sensors 30, and information from a map database, e.g., the static road map data, does not agree. In this case, the at least one first path 201 may instead be considered a main source for path selection.

In some scenarios, thermal traces, i.e. the at least one first path 201, may be used for monitoring an autonomous driving function of the first vehicle 1. For example, a driving function of the first vehicle 1 may generate a trajectory based on standards sensors used for autonomous driving, e.g., any one or more out of: camera, lidars, radar, gps+map, etc. The resulting trajectory may be the at least one second path 204, and may be compared to the path generated from a thermal image, e.g., compared to the at least one second path 201, and if there is a miss-match between the two the first vehicle 1 may be brought to a stop. In such a case it may be assumed that something has happened which the autonomous driving system of the first vehicle 1 is not aware of and therefore the safest action may be to stop the first vehicle 1, e.g., to await instructions from a user. As safety operations of the first vehicle 1 is always active, it may also be possible to continue operating the first vehicle 1, e.g., in the selected candidate path.

In some examples, a leading vehicle of the at least one second vehicle 200 may be configured to leave an intentional thermal trace, e.g., to indicate a redundant source of information, such that the first vehicle 1 can be configured to follow the leading vehicle at least partly by means of embodiments or examples herein.

In some examples, identifying the at least one first path, e.g., as in actions explained above, may further comprise determining a traffic situation of the road 202, e.g., based on the heat sensor data, frequency of vehicles in the at least one second vehicle 200 travelling in the road 202 may be determined. Based on the traffic situation, the first vehicle 1 may determine one or more configurations or modes to use for travelling the road 202.

Figure 8:
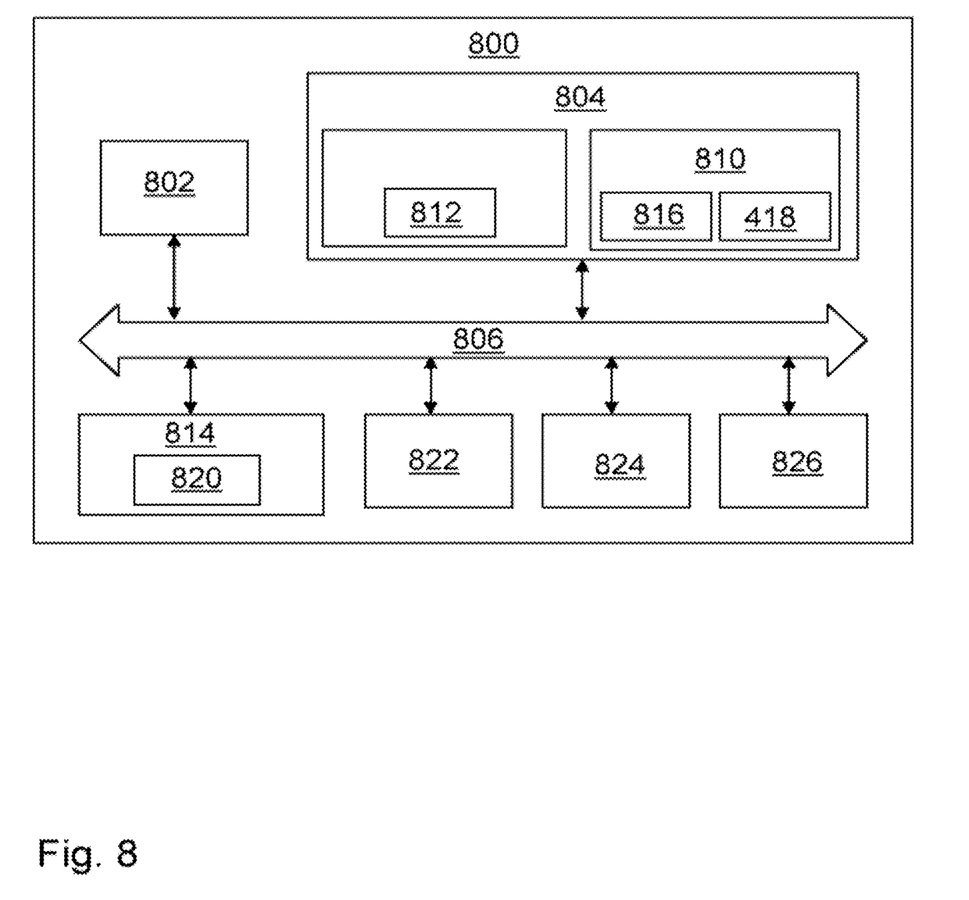
FIG. 8 is a schematic diagram of an exemplary computer system for implementing examples disclosed herein, according to one example.

FIG. 8 is a schematic diagram of the computer system 800 for implementing examples disclosed herein. The computer system 800 is adapted to execute instructions from a computer-readable medium to perform these and/or any of the functions or processing described herein. The computer system 800 may be connected (e.g., networked) to other machines in a LAN, an intranet, an extranet, or the Internet. While only a single device is illustrated, the computer system 800 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 800 may comprise at least one computing device or electronic device capable of including firmware, hardware, and/or executing software instructions to implement the functionality described herein. The computer system 800 may include the processor device 802 (may also be referred to as a control unit, e.g., as part of a control system), a memory 804, and a system bus 806. The computer system 800 may include at least one computing device having the processor device 802. The system bus 806 provides an interface for system components including, but not limited to, the memory 804 and the processor device 802. The processor device 802 may include any number of hardware components for conducting data or signal processing or for executing computer code stored in memory 804. The processor device 802 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the processor device 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with a processor device 802. A basic input/output system (BIOS) 812 may be stored in the non-volatile memory 808 and can include the basic routines that help to transfer information between elements within the computer system 800.

The computer system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 814 and/or in the volatile memory 810, which may include an operating system 816 and/or one or more program modules 818. All or a portion of the examples disclosed herein may be implemented as a computer program product 820 stored on a transitory or non-transitory computer-usable or computer-readable storage medium (e.g., single medium or multiple media), such as the storage device 814, which includes complex programming instructions (e.g., complex computer-readable program code) to cause the processor device 802 to carry out the steps described herein. Thus, the computer-readable program code can comprise software instructions for implementing the functionality of the examples described herein when executed by the processor device 802. The processor device 802 may serve as a controller or control system for the computer system 800 that is to implement the functionality described herein.

The computer system 800 also may include an input device interface 822 (e.g., input device interface and/or output device interface). The input device interface 822 may be configured to receive input and selections to be communicated to the computer system 800 when executing instructions, such as from a keyboard, mouse, touch-sensitive surface, etc. Such input devices may be connected to the processor device 802 through the input device interface 822 coupled to the system bus 806 but can be connected through other interfaces such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computer system

800 may also include a communications interface 826 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising." "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to select a candidate path for a first vehicle to travel, the processor device is further configured to:
   obtain, from at least one temperature sensor, heat sensor data indicative of heat distributed on a road surface of a road located ahead of the first vehicle in a driving direction of the first vehicle,
   based on the heat distributed on the road surface, identify at least one first path travelled by at least one second vehicle,
   select a candidate path for the first vehicle to travel, wherein the candidate path is selected out of the at least one first path,
   by the processor device, from one or more second sensors of the first vehicle and/or using static road map data of the road, identifying at least one second path, and wherein selecting the candidate path out of the at least one first path for the first vehicle to travel is performed in response to detecting a difference between the at least one first path and the at least one second path; and
   by the processor device, controlling the first vehicle based on the selected path.

2. A computer-implemented method for selecting a candidate path for a first vehicle to travel, the computer-implemented method comprising:
   by a processor device of a computer system, obtaining from at least one temperature sensor, heat sensor data indicative of heat distributed on a road surface of a road located ahead of the first vehicle in a driving direction of the first vehicle,
   by the processor device, based on the heat distributed on the road surface, identifying at least one first path travelled by at least one second vehicle,
   by the processor device, selecting a candidate path for the first vehicle to travel, wherein the candidate path is selected out of the at least one first path,
   by the processor device, from one or more second sensors of the first vehicle and/or using static road map data of the road, identifying at least one second path, and wherein selecting the candidate path out of the at least one first path for the first vehicle to travel is performed in response to detecting a difference between the at least one first path and the at least one second path; and
   by the processor device, controlling the first vehicle based on the selected path.

3. The method of claim 2 further comprising: by the processor device, upon detecting the difference between the at least one first path and the at least one second path, triggering the first vehicle to stop and/or to operate in a different mode.

4. The method of claim 2, wherein obtaining the heat sensor data comprises obtaining a segmented representation of the heat distributed on the road surface, wherein each segment of the segmented representation is associated with a respective heat value, and wherein identifying the at least one first path travelled by the at least one second vehicle comprises identifying at least one set of segments, wherein a respective heat value of each segment in the at least one set of segments is above a predefined heat threshold.

5. The method of claim 4, wherein the at least one set of segments is arranged in a respective shape indicative of a respective path which can be travelled by the first vehicle.

6. The method of claim 5, wherein a width of the respective shape is within a range of a predefined vehicle width and/or a predefined vehicle track width.

7. The method of claim 4, wherein identifying the at least one set of segments comprises identifying a first set of segments and a second set of segments, wherein the first set of segments and the second set of segments are separated by one or more segments associated with a respective heat value below the predefined heat threshold.

8. The method of claim 2, wherein the at least one first path comprises at least two paths, and wherein selecting the path for the first vehicle out of the at least one first path comprises:
   determining a heat metric of the respective paths of the at least one first path, wherein determining the heat metric is based on the heat distributed on the road surface and wherein determining the heat metric is performed using a predefined evaluation function, and
   selecting the path with the evaluated heat metric indicative of a highest heat.

9. The method of claim 2, wherein identifying the at least one first path travelled by the at least one second vehicle is further based on additional sensor data and/or static road map data of the road.

10. A vehicle comprising a computer system configured to perform the method of claim 2, and wherein the vehicle is at least partly autonomous.

11. The vehicle of claim 10, wherein the vehicle comprises at least one temperature sensor configured to obtain heat sensor data indicative of heat distributed on a road surface of a road located ahead of the vehicle in the driving direction of the vehicle.

12. A non-transitory computer-readable storage medium comprising instructions, which when executed by the processor device, cause the processor device to perform the method of claim 2.

* * * * *